Figure 1:
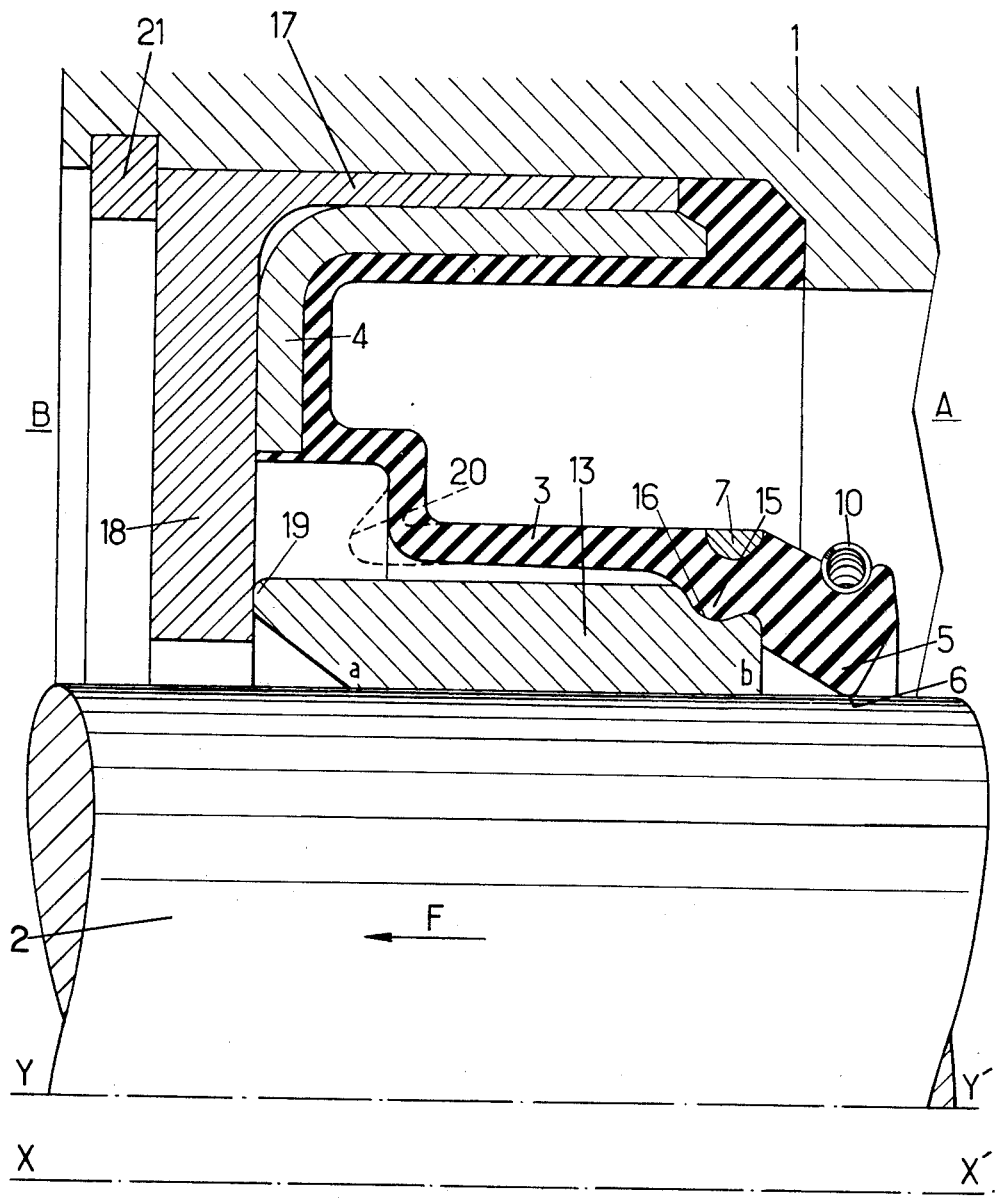

United States Patent [19]

Bertin

[11] 4,195,854
[45] Apr. 1, 1980

[54] SHAFT SEAL ASSEMBLIES

[76] Inventor: Jacques Bertin, 19, rue du Tintoret, 92600 Asnieres, France

[21] Appl. No.: 904,891

[22] Filed: May 11, 1978

Related U.S. Application Data

[63] Continuation-in-part of Ser. No. 622,227, Oct. 14, 1975, Pat. No. 4,102,538.

[30] Foreign Application Priority Data

May 11, 1977 [FR] France .................................. 77 14434

[51] Int. Cl.² ............................................. F16J 15/32
[52] U.S. Cl. ...................................... 277/153; 277/58; 308/187.1; 277/237 R
[58] Field of Search ............. 277/58, 152, 153, 237 R, 277/1; 308/187.1, 187.2

[56] References Cited

U.S. PATENT DOCUMENTS

| | | | |
|---|---|---|---|
| 2,992,027 | 7/1961 | Wright et al. .......................... | 277/58 |
| 3,099,454 | 7/1963 | Walinski ........................... | 277/152 X |
| 3,207,521 | 9/1965 | Dega ................................... | 277/58 X |
| 3,455,564 | 7/1969 | Dega ................................... | 277/153 X |
| 3,510,138 | 5/1970 | Bowen et al. ........................ | 277/153 |
| 3,741,615 | 6/1973 | Otto .................................... | 308/187.1 |
| 3,814,446 | 6/1974 | Derman ......................... | 308/187.1 X |
| 3,893,735 | 7/1975 | Brenner ........................ | 308/187.1 X |
| 3,917,286 | 11/1975 | Loyd ................................ | 277/153 X |
| 3,947,077 | 3/1976 | Berg et al. ......................... | 308/187.1 |
| 4,102,538 | 7/1978 | Bertin .................................. | 277/153 |

FOREIGN PATENT DOCUMENTS

| | | | |
|---|---|---|---|
| 1117124 | 2/1956 | France .................. | 277/237 R |
| 379967 | 9/1932 | United Kingdom ..................... | 277/153 |

*Primary Examiner*—Robert S. Ward, Jr.
*Attorney, Agent, or Firm*—Larson, Taylor and Hinds

[57] ABSTRACT

In a shaft seal assembly for a shaft rotatably mounted in a frame with a ball bearing, the seal includes an elastomer sleeve that bears on a ring fitted over the shaft, the ring in turn bearing axially on a stop. In one embodiment, electrical contact between the ring and the stop on the one hand and electrical contact between the ring and the shaft on the other ground any stray electrical currents in the ball bearings.

10 Claims, 2 Drawing Figures

SHAFT SEAL ASSEMBLIES

This application is a continuation-in-part of my copending application Ser. No. 622,227, filed Oct. 14, 1975, now U.S. Pat. No. 4,102,538, issued July 25, 1978.

The invention relates to seals of the kind described in the parent application for placing in a housing through which passes a shaft rotating relatively to a part or frame comprising said housing, said seals comprising an elastomer sleeve through which the shaft passes and which is supported by a frame fixed in said housing, contact with the shaft taking place through at least one lip integral with the sleeve.

Among other arrangements in said parent application it was suggested to provide inside said sleeve, a bearing ring or collar capable of serving as support to said sleeve over a portion of its length, which may be useful, especially in the case of an appreciable pressure difference between the two environments divided by the seal.

It is provided, in accordance with the present invention, to use said ring, or any other similar member, to ensure in combination with an appropriate fixed or adjustable stop, the stability of the sleeve and lip assembly, i.e. to prevent axial movement of this assembly under the effect of a pressure difference, or for other causes.

It should moreover be noted that if the ring and the stop are metallic, the permanent contact thus formed, between these elements as well as between the ring and the shaft, will lead away electric currents and so avoid deterioration of the bearings by these stray currents.

Supplementary means, using the resilience of the sleeve, may be provided for ensuring the permanence of this contact despite vibrations or other disturbing means.

The invention comprises, apart from these arrangements, certain other arrangements which are preferably used at the same time and which will be more explicitly discussed hereafter; particularly:

an arrangement according to which said ring, instead of comprising, on its surface in contact with the shaft or adjacent thereto, rectilinear generatrices, comprises convex generatrices.

With this arrangement deterioration of the ends of the ring is avoided, if considerable whipping of the shaft occurs.

The invention relates, more particularly, to certain modes of application as well as to certain embodiments of said arrangements; and it relates more particularly still and this as new industrial products, to seals of the kind in question comprising application of these same arrangements, as well as to the special elements for their construction and assemblies using such seals.

It will, in any case, be well understood with the help of the description which follows as well as the accompanying drawings, which description and drawings are of course given especially by way of example.

FIG. 1 of these drawings shows in partial axial section an assembly comprising a rotary shaft inside a housing with an elastomer seal placed therebetween, the whole in accordance with the invention.

Figure 2:
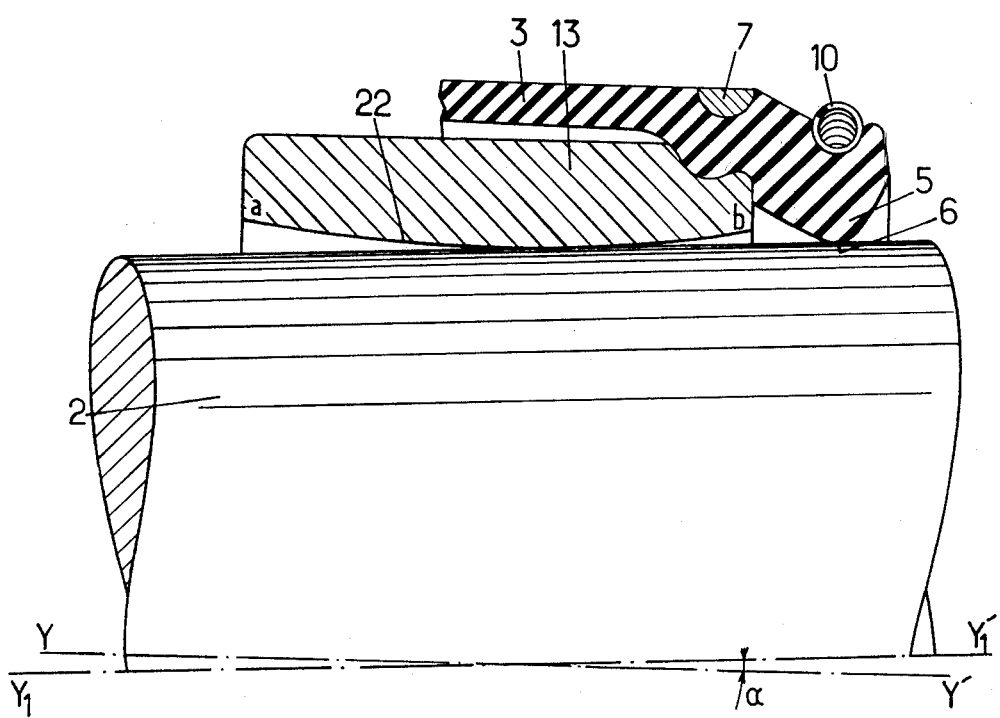

FIG. 2 shows similarly, in a partial view, an assembly of the same kind, according to another embodiment of the invention.

According to the invention and, more especially, according to those of its modes of application, as well as according to those embodiments of its different parts to which it seems preference should be given, with a view to mounting in a housing provided in any machine part 1 whatever, a shaft 2 suitably supported by bearings, particularly ball bearings (not shown), with a resilient seal of the kind in question placed therebetween, the following or similar is the way to set about it.

There is essentially provided for this seal, as is usual, a conical or cylindro-conical elastomer sleeve 3 (FIG. 1), adapted to surround the shaft, this sleeve being integral with a frame 4, so as to be fixed inside a recess of part 1 (or in any other way) and being extended at one of its ends by at least one edge forming a lip 5 for contacting with shaft 2, along a contact ridge 6 under a suitable resilient pressure.

There is provided furthermore, for supporting the sleeve 3 from the inner side, following arrangements similar to some of those of the parent application, a sleeve, collar or ring 13 adapted to be engaged on shaft 2, preferably with reduced clearance. The contact ring 13 takes place for example by engagement of a flange 15 of the sleeve in a groove 16 of ring 13, it being understood that any other connecting means may be provided.

Then, having this assembly, it is completed by stop means adapted to resist axial movement of sleeve 3 and ring 13, particularly under the effect of pressure differences between environments A and B.

These means comprise for example a supplementary frame 17, 18, of which one transverse wall 18, close to shaft 2, is intended to contact the end of the corresponding ridge 19 of ring 13.

Advantageously, supplementary means may be provided for ensuring the maintenance of this contact, despite disturbing actions. Thus, all that is generally required is to give the base of sleeve 3, at 20, a shape (shown in dotted line) such that it is necessary to deform it elastically when mounting, this resilient deformation ensuring a bearing force F against frame 18.

Thus is obtained an assembly which offers great stability, and operational safety, despite pressure variations between A and B or despite any other disturbing actions (vibrations etc. ..).

But, in addition, if parts 13 and 18 are metallic, the assembly conducts current between shaft 2 and the machine, which enables stray currents to be removed, e.g. in axle-boxes of railway vehicles, through the path: shaft 2, ring 13, frame 18, 17, housing 1. Thus is avoided the deterioration of the bearings.

To be certain that the electric contact between ring 13 and shaft 2 remains established, supplementary means may be provided exerting a transverse action between these two elements. For this purpose, it is sufficient during moulding of the sleeve and its lip, to arrange the axis XX' of said sleeve, when mounting on the shaft, staggered in relation to axis YY' thereof, as shown in the drawing. Any other means may be provided for the same purpose.

It has been assumed, furthermore, in the drawings, that the sleeve was combined with a second ring 7 disposed inside, it being understood that this ring could possibly be omitted. An annular spring is provided at 10.

A stop 21 is provided for locking frame 17, 18 in its housing.

There is shown in FIG. 2 an extra arrangement of the invention, for allowing the ends of the ring to be relieved with respect to stresses which may be engendered in the case of considerable whipping of shaft 2.

In a case of this kind, i.e. when axis YY' assumes fairly marked angular positions in relation to the correct direction (this axis coming for example to $Y_1Y_1'$, with an angle α, FIG. 2), the result will be excessive stresses at ends a and b of the ring (FIG. 1).

To remedy this, in accordance with said arrangement, the inner profile of the ring, turned towards the shaft, is given a shape such that it comprises, no longer rectilinear generatrices, but convex generatrices, as shown at 22 (FIG. 2). Thus all stresses at a and b are avoided.

Of course, the curvature at 22 will be determined beforehand with respect to the possible value of angular deviations α.

Following which, whatever the embodiment adopted, seals are provided whose operation is sufficiently evident from what has gone before for it to be pointless to dwell thereon and which present, in relation to those of the kind in question already existing, different advantages, especially:

that of being very stable despite pressure variations or vibrations or any other outside actions, and that of permitting stray electric currents to be eliminated and thus to improve the resistance of the ball bearings.

As is evident and as it follows moreover already from what has gone before, the invention is in no wise limited to those of its modes of application and embodiments which have been more especially considered; it embraces, on the contrary, all variations thereof.

I claim:

1. A shaft seal assembly for a shaft or the like relatively movable with respect to a housing and comprising a rigid frame fixed in the housing and having a stop;

a ring member surrounding the shaft when said assembly is operably installed and axially engagable with said stop;

an elastomeric sleeve having a main body portion and a central bore therethrough through which the shaft can pass, said sleeve being borne by said frame around said ring member and having at least one lip integral with said main body portion for being in contact with the shaft and a section of said main body portion axially spaced from said lip which bears on said ring member, said ring member being located between said lip and said stop, and resilient means for exerting an axial force on said ring member to maintain axial contact between said ring member and said stop and for preventing axial movement of said sleeve particularly under pressure differences between each side of said sleeve.

2. A seal assembly according to claim 1, wherein the inner profile of the ring member in contact with the shaft when installed has a convex shape to take into account the possible angular deviations of the shaft.

3. An assembly as claimed in claim 1 wherein said resilient means comprises a deformation in said sleeve after said sleeve is mounted in sealing engagement with the shaft, which deformation creates an axial bearing force in the direction of said stop.

4. An assembly as claimed in claim 1 wherein said lip is located at an axial end portion of said sleeve main portion, wherein said sleeve section in contact with said ring member comprises a flange extending radially inwardly, and wherein said ring member includes a groove in the exterior, radial surface thereof for receiving said flange.

5. An assembly as claimed in claim 1 wherein said elastomeric sleeve has a generally U-shaped cross-section taken through a radial portion thereof with an inner arm section mounting said lip at the distal end thereof, a generally radially extending base section and an outer arm section in engagement with the housing when said assembly is installed.

6. An assembly as claimed in claim 5 wherein said sleeve further includes a rigid annular support member having a generally L-shaped cross-section taken through a radial portion thereof and integrally mounted to the outside of said upper arm section and to at least a portion of said base section extending inwardly therealong.

7. An assembly as claimed in claim 6 wherein said support member extends only along an outer portion of said sleeve base section and said resilient means comprises a deformation in the inner portion of said sleeve base section after said sleeve is mounted in sealing engagement with the shaft, which deformation creates an axial bearing force in the direction of said stop; and said assembly further including means for maintaining contact between said ring member and the shaft despite possible transverse movements thereof, said maintaining means being formed by giving to said sleeve a shape such that during installation, it is necessary to move said sleeve transversely to the axis of the shaft.

8. An assembly as claimed in claim 1 or 7 as adapted for use with a bearing supporting the shaft which is also metallic, wherein said rigid frame is of an electrically conductive metallic substance and said ring member is of an electrically conductive metallic substance in electrical contact with the shaft, whereby the bearing is electriclly short circuited through the contact between said frame and said ring member and thus stray electrical currents cannot be produced in the bearing.

9. A seal according to claim 8, characterised by the fact that means are provided for maintaining metallic contact between the ring and the shaft, despite possible transverse movement.

10. A seal according to claim 9, characterised by the fact that said maintaining means are formed by giving to the resilient sleeve a shape such that, during mounting, it is necessary to move it resiliently transversely to the axis of the shaft.

* * * * *